United States Patent [19]

Larsen

[11] Patent Number: 4,580,143

[45] Date of Patent: Apr. 1, 1986

[54] VISCOSITY CONTROL OF INK-JET INKS

[75] Inventor: James G. Larsen, Milpitas, Calif.

[73] Assignees: Ricoh Systems, Inc.; Ricoh Co. Ltd., both of San Jose, Calif.

[21] Appl. No.: 623,994

[22] Filed: Jun. 25, 1984

[51] Int. Cl.[4] ........................ G01D 9/00; G01D 15/16; G01N 31/00

[52] U.S. Cl. ................................ 346/1.1; 346/140 R; 73/29

[58] Field of Search ............. 346/75, 140 IS, 140 PD, 346/1.1; 73/29

[56] References Cited

U.S. PATENT DOCUMENTS

| | | | |
|---|---|---|---|
| 3,761,953 | 9/1973 | Helgeson et al. | 346/75 |
| 3,771,568 | 11/1973 | Bischoff et al. | 346/140 IJ |
| 3,835,881 | 9/1974 | Dal | 346/140 IJ |
| 3,930,258 | 12/1975 | Dick et al. | 346/75 |
| 4,130,126 | 12/1978 | Chocholaty | 346/75 |
| 4,190,846 | 2/1980 | Yamamoto et al. | 346/140 IJ |
| 4,215,568 | 8/1980 | Garber | 73/29 |
| 4,422,085 | 12/1983 | Sumitomo | 346/140 IJ |

*Primary Examiner*—E. A. Goldberg
*Assistant Examiner*—Mark Reinhart
*Attorney, Agent, or Firm*—Flehr, Hohbach, Test, Albritton & Herbert

[57] ABSTRACT

A method is provided for maintaining the viscosity of a consumable water-containing ink supply at a constant value by measuring water vapor content of the vapor in equilibrium with the ink supply and adding a sufficient amount of water to restore the water vapor content to a predetermined value. The method has particular application for controlling the viscosity of ink used in jet ink printers.

6 Claims, 3 Drawing Figures

VISCOSITY CONTROL OF INK-JET INKS

The present invention is directed to a method for controlling ink viscosity in ink storage means for printers.

Problems with continuous ink-jet printers results from the criticality of rapid and smooth flow of the ink through the various conduits, particularly through the ink jets. The viscosity of the ink changes over time due to the recycling of concentrated evaporated ink from the print head back into the ink storage means. Therefore, the viscosity of the ink within the storage means changes due to solvent evaporation, which comprises water, which occurs at the print head. Eventually, the viscosity of the ink becomes high enough to cause malfunctioning in the ink system, particularly at the ink jet.

It is, therefore, an object of the present invention to provide a method for maintaining the viscosity of the water-containing ink supply for ink-jet printers at a predetermined level.

It is the further object of the present invention to provide a method for replenishing the water-containing ink supply with water to reestablish a predetermined viscosity.

These and other objects will become apparent from the following description of the specific embodiments and claims.

Figure 1:
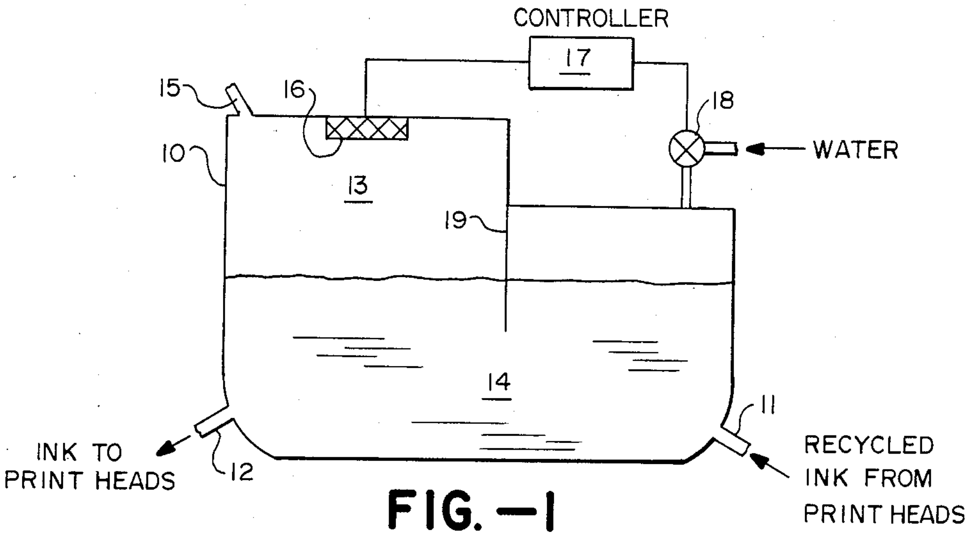
FIG. 1 is a schematic diagram of an ink container accommodating an electronic moisture sensor and electronic controller.

The present invention provides a method for maintaining the viscosity of a consumable supply of water-containing ink at a predetermined level in a substantially enclosed container. The container accommodates a vapor space in equilibrium with the ink. The present method comprises the steps of (a) measuring the water vapor content in the vapor space in the container; (b) comparing the measured water vapor content with a predetermined water vapor content value; (c) and adding water to the ink when the measured water vapor content is less than the predetermined value. The water is added in an amount sufficient to increase the measured water vapor content at least to the predetermined value.

Inks which are usually used in ink-jet printers are concentrated, aqueous-organic solutions containing water as the major component. Since the relative proportions of the partial pressures of the various vapor components of a vapor in equilibrium with a liquid are related to the relative proportions of the liquid components in the liquid, concentration of a liquid component of a particular liquid may be measured by measuring the partial pressure of its vapor which is in equilibrium with the surface of the liquid. In most inks, since the major component is water, to a first approximation it may be assumed that the water vapor pressure is an inverse function of the total solute concentration. Therefore, by measuring the water content of the vapor in equilibrium with the ink, a correlation may be made to the water content of the ink, and thus to the solute concentration in the ink, and thus to the viscosity of the ink.

While the various mathematical relationships relating the measured water vapor pressure to the viscosity of the ink may be readily determined by those of ordinary skill in the art, this correlation may be also empirically determined from a standard, such as a reference tank of the same capacity and dimensions of the ink supply tank which is to be used to contain the consumable ink. The reference tank may be filled with ink having predetermined water content and allowed to equilibrate the ink with the vapor space within the tank. The water vapor content in the vapor space may then be measured. Based on the capacity of the reference tank, the amount of water may also be readily determined which is needed to be added to the tank in order to reestablish the preferred ink viscosity. Once this data is obtained, it may be stored, for example, in a read-only memory and utilized in connection with an appropriate electronic controller according to the present invention which automatically adds water to the ink supply tank.

The method according to the present invention of indirect viscosity measurement responds to changes in concentration of that element which is lost by evaporation; namely, water. Thus, it is independent of other ink components and all colligative ink properties. This method may be applied to all aqueous based ink systems, and since it is a non-contact method, that is, since the vapor sensor is not in contact with the ink, the sensor cannot be effected by the chemical properties of the ink. However, the organic components in the ink vehicle also have a vapor pressure and will be present in the atmosphere in amounts proportional to their respective vapor pressures. Consequently, the moisture sensor used must be immune to these organic vapors. For this reason, polymer based resistance sensors, such as the sulfonated polystyrene types, are unsuitable for this application unless appropriately protected.

Referring to FIG. 1, there is illustrated a schematic diagram of one embodiment of the present invention. Ink supply tank 10 accommodates an inlet 11 for recycled ink from the printing head and an outlet 12 for conducting fresh ink to the print head. The vapor space 13 within the tank is in equilibrium with the liquid ink 14. The total vapor pressure in the space 13 is atmospheric since it equilibrated to the atmosphere through capillary bleed tube 15. An electronic moisture sensor 16 is located within the vapor space 13 to measure the water concentration of the vapor. Such sensors are known and may be, for example, commercially available Dunsmore, Pope, thin film aluminum oxide, capacitance resistance or strain gauge type sensors. The preferred sensors are resistance and biomechanical strain gauge type sensors from Hygrometrix Inc. These sensors are based on a naturally occurring cellulose crystallite material and possess both chemical stability and adequate electrical response characteristics. The sensor is electronically connected to electronic controller 17 which electronically opens and closes valve means 18 to add water to the tank when the measured water vapor content falls below a predetermined level. The controller 17 may either be programmed to admit predetermined increments of water with a time delay to allow vapor equilibration to occur in space 13, or, alternatively, controller 17 may be programmed to continuously admit water into the tank until sensor 16 detects that the proper level has been attained, whereby the valve means 18 will be automatically closed. Other ways of programming controller 17 will be readily apparent. As shown, the tank is accommodated with a baffle 19 so that as the water is admitted into the tank, the splashing and agitation does not disturb the surface of the ink in contact with the vapor space 13 to assure that accurate measurements of the water vapor content may be continuously taken.

Figure 2:
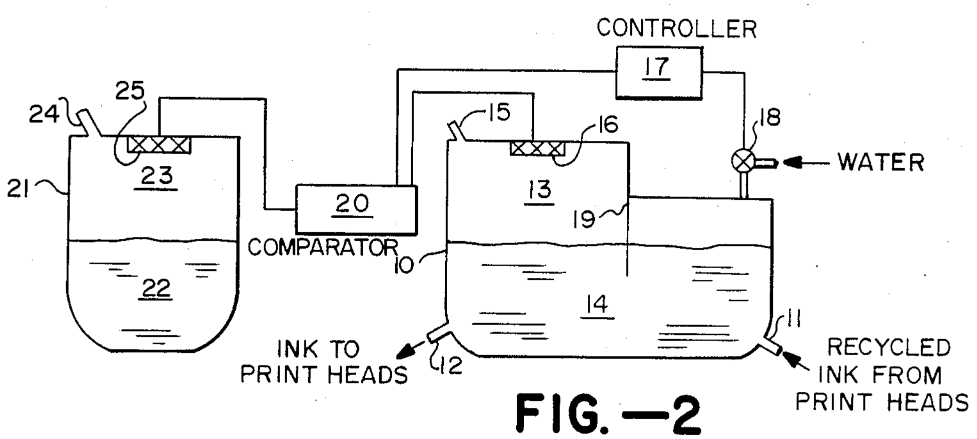
FIG. 2 is a schematic diagram of an ink supply accommodating an electronic moisture sensor, an electronic controller, and electronic comparitor for comparing readings to a reference tank.

Referring to FIG. 2, a second embodiment is disclosed. In FIG. 2, tank 10 is accommodated with an electronic comparitor 20, in addition to the other elements shown in FIG. 1. The comparitor 20 is electrically connected to a reference tank 21 which contains a non-consumable supply of ink 22 and a vapor space 23 in equilibrium therewith at atmospheric pressure due to capillary bleed to 24. Tank 21 also accommodates an electronic moisture sensor 25, preferably of the same type as sensor 16. Since the tank 21 contains a non-consumable source of ink, its viscosity will remain at the preferred value. Therefore, the moisture vapor content of the vapor space 23 will continuously give the correct reading for the proper viscosity. Moreover, the moisture content of the vapor 23 will be self-correcting, with changes in ambient temperature and pressure.

The sensor 25 is electrically connected to comparitor 20. Comparitor 20 is also electrically connected to sensor 16. The function of the comparitor is to compare the values from sensor 16 and 25. If the value for the water content as read through sensor 16 falls below that of sensor 25, the comparitor, which is electrically connected to controller 17, will activate controller 17 to open valve means 18 and admit an appropriate amount of water into tank 10. When the value from sensor 16 is reestablished to be at least equal to that of the value from sensor 25, the input of water into tank 10 will cease. While several ways of designing comparitor 20 may be achieved, one design is to couple the reference ink sensor 25 and the consumable ink sensor 16 via a bridge circuit. An imbalance in the bridge circuit caused by a decrease of the water vapor content of vapor 13 (i.e., an increase in the solute concentration of evaporating ink 14) serves to signal the controller to add a sufficient amount of water to restore the system balance.

Figure 3:
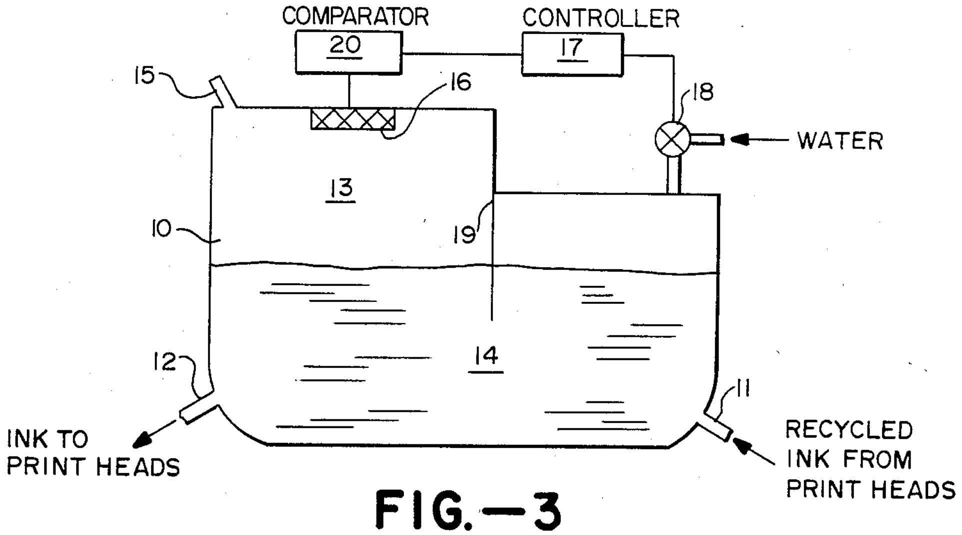
FIG. 3 is a schematic diagram of an ink supply tank accommodating an electronic moisture sensor, controller and comparitor.

A third embodiment of the present invention is diagrammed in FIG. 3. The tank 10 in FIG. 3 contains all of the elements of that of tank 10 shown in FIG. 1 with the addition of a comparitor 20 interposed between the sensor 16 and controller 17. In this embodiment, all of the information which may be generated by the reference ink tank 21 and sensor 25 shown in FIG. 2 may be stored on a read-only memory (ROM) device. This information may contain the proper predetermined water vapor content value at various temperatures and pressures. Therefore, referring to FIG. 3, the comparitor 20 references the ROM device when processing signals from the moisture sensor 16. The comparitor 20 may then appropriately control the controller 17 when addition of water to tank 10 is required.

What is claimed is:

1. A method for maintaining the viscosity of a consumable supply of water-containing ink at a predetermined level in a substantially enclosed container containing said ink, said container accommodating a vapor space equilibrated with said ink, comprising the steps of (a) measuring the water vapor content in said vapor space;

(b) comparing said measured water vapor content with a predetermined water vapor content value;

(c) adding water to said ink supply when said water vapor content is less than said predetermined water vapor content value, said water being added in an amount sufficient to increase said water vapor content to at least said predetermined value.

2. A method according to claim 1 further comprising the step of measuring the water vapor content in the vapor space in a second substantially enclosed container containing a non-consumable water-containing ink supply maintained at the same temperature and pressure as said consumable ink supply to determine said predetermined water vapor content value in step (b).

3. A method according to claim 1 further comprising retrieving said predetermined water vapor content value for step (b) from a read-only memory device on which is stored set of values for said water vapor content correlated to various temperatures and pressures, said set of values determined from the vapor space in a second substantially enclosed container containing a non-consumable ink supply.

4. An apparatus for maintaining the viscosity of a consumable supply of water-containing ink at a predetermined level comprising a substantially enclosed container for containing said ink, said container accommodating a vapor space for equilibration of vapor with said ink, measuring means for measuring the water vapor content in said vapor space; comparing means for comparing said measured water vapor content with a predetermined water vapor water content value; and control means for adding water to said ink supply when said water vapor content is less than said predetermined water vapor content value in an amount sufficient to increase said water vapor content to at least said predetermined value.

5. An apparatus according to claim 4 further comprising a second substantially enclosed container for containing a non-consumable water-containing ink supply maintained at the same temperature and pressure as said container for said consumable ink supply, said second container accommodating a second measuring means for measuring water vapor content in the vapor space of said second container, wherein the water vapor content measured in said second container is said predetermined water vapor content value.

6. An apparatus according to claim 4 wherein said comparing means comprises a read-only memory device on which is stored a set of values for said predetermined water vapor content value correlated to various temperatures and pressures.

* * * * *